US008425176B2

(12) United States Patent
Forcina

(10) Patent No.: US 8,425,176 B2
(45) Date of Patent: Apr. 23, 2013

(54) RACK FOR HOLDING X-RAY CASSETTES AND THE LIKE

(76) Inventor: Alex Forcina, Virginia, VA (US)

( * ) Notice: Subject to any disclaimer, the term of this patent is extended or adjusted under 35 U.S.C. 154(b) by 397 days.

(21) Appl. No.: 12/800,886

(22) Filed: May 25, 2010

(65) Prior Publication Data
US 2010/0303601 A1 Dec. 2, 2010

Related U.S. Application Data

(60) Provisional application No. 61/217,023, filed on May 26, 2009.

(51) Int. Cl.
B65G 59/00 (2006.01)
B65G 59/10 (2006.01)
B65G 59/06 (2006.01)
B65H 1/12 (2006.01)
G07F 11/14 (2006.01)
G07F 11/04 (2006.01)

(52) U.S. Cl.
USPC ........ 414/797.9; 221/270; 221/113; 221/232; 414/795.6

(58) Field of Classification Search ............... 414/797.4, 414/797.9; 221/220, 232, 270, 279, 65; 271/129, 271/131, 141, 142, 143, 149, 42
See application file for complete search history.

(56) References Cited

U.S. PATENT DOCUMENTS

| 862,172 | A | * | 8/1907 | Kemper | 271/129 |
| 1,069,848 | A | * | 8/1913 | Brown | 271/129 |
| 1,246,592 | A | * | 11/1917 | Harvey | 271/128 |
| 1,349,953 | A | * | 8/1920 | Hanson | 194/248 |
| 1,898,664 | A | * | 2/1933 | Howe et al. | 414/795.6 |
| 3,023,873 | A | * | 3/1962 | Horton | 194/291 |
| 3,602,378 | A | * | 8/1971 | Thompson | 414/797.9 |
| 4,644,427 | A | * | 2/1987 | Ashby | 360/98.04 |
| 4,665,455 | A | * | 5/1987 | Mesher | 360/99.03 |
| 4,693,659 | A | * | 9/1987 | Burke et al. | 414/797.9 |
| 5,165,571 | A | * | 11/1992 | Schlumpf | 221/213 |
| 5,340,995 | A | | 8/1994 | Verbeke | |
| 6,346,714 | B1 | | 2/2002 | Muller | |
| 6,926,167 | B2 | * | 8/2005 | Mazlout et al. | 221/232 |
| 7,075,101 | B2 | | 7/2006 | Iiyama | |
| 7,482,613 | B2 | | 1/2009 | Wendlandt | |
| 2010/0303601 | A1 | * | 12/2010 | Forcina | 414/797.9 |

OTHER PUBLICATIONS

U.S. Appl. No. 12/171,546, filed Dec. 9, 2009, Hoelzl.

* cited by examiner

Primary Examiner — Gregory Adams

(57) ABSTRACT

The rack has an inclined bottom, a slightly angled upstanding back wall, a right endwall and a short front wall defining a media cassette receiving area. Upon activation by a manually operated handle a withdrawal mechanism disposed behind the back wall, containing a carriage having a finger selectively protruding therethrough urges the rearmost media cassette in the rack along the back wall until it may be grasped by an operator. Subsequent cassettes settle backward against the back wall upon withdrawal of the rearmost media cassette. Cassettes may be added to the rack forward of any media cassettes currently therein. In this way a FIFO queue is maintained regardless of the number or mix of media cassettes stored in the rack.

17 Claims, 13 Drawing Sheets

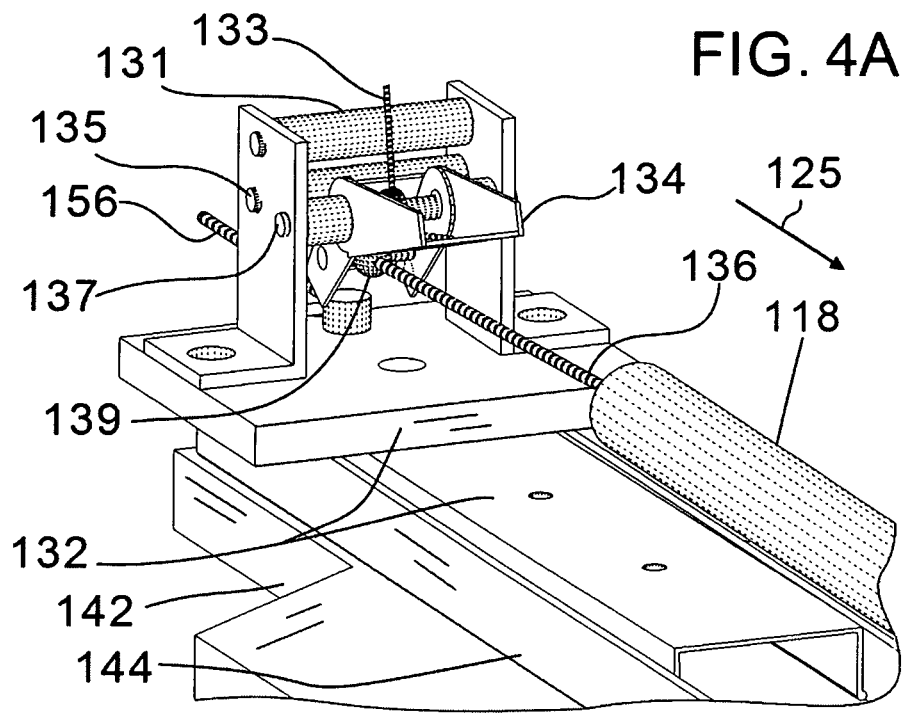
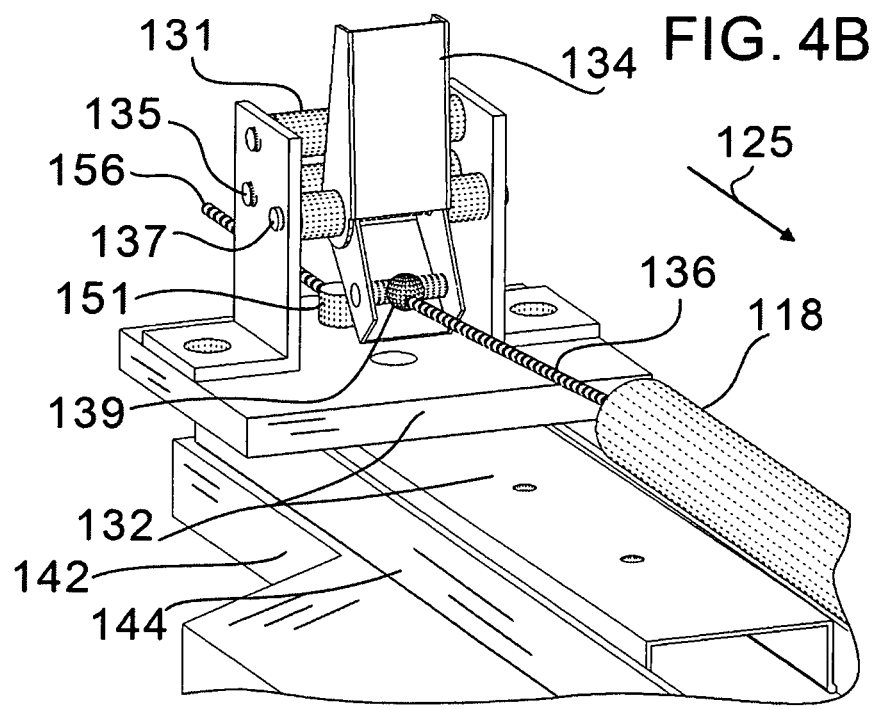

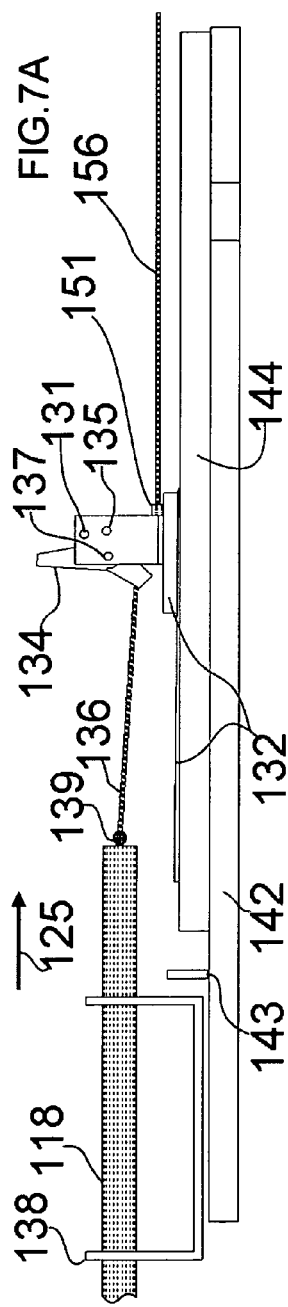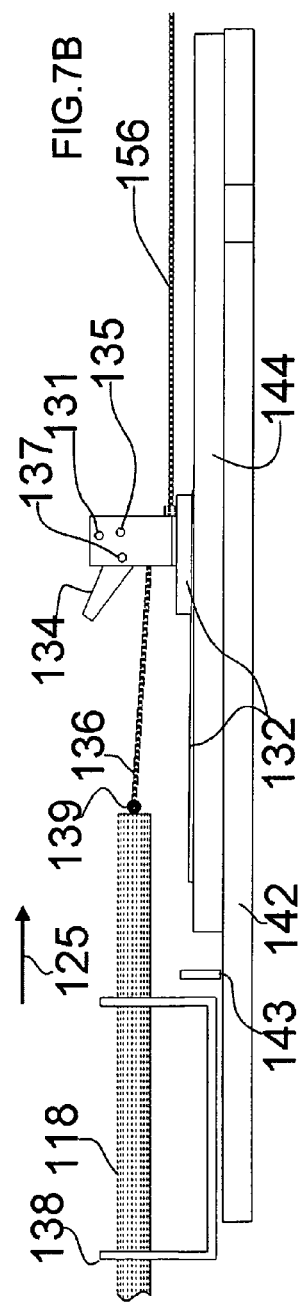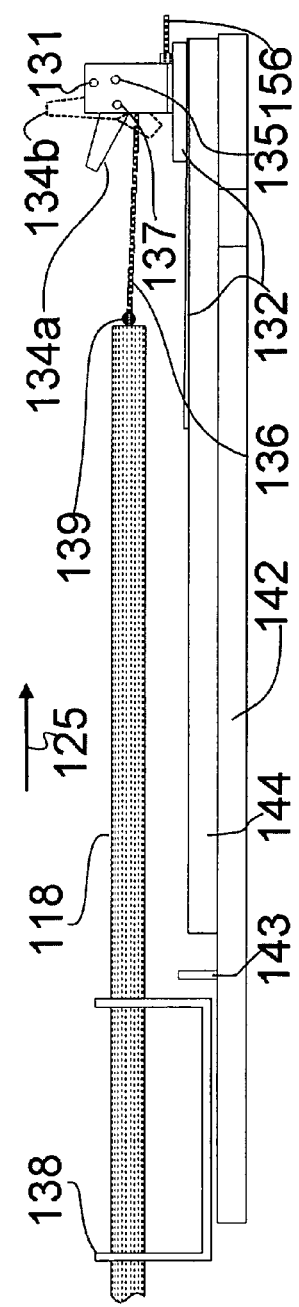

RACK FOR HOLDING X-RAY CASSETTES AND THE LIKE

RELATED APPLICATIONS

This application claims priority to U.S. Provisional Patent Application No. 61/217,023 for PACS RAC, filed May 26, 2009 in accordance with 37 C.F.R. §119(e) and which is included herein in its entirety by reference.

FIELD OF THE INVENTION

The invention pertains to racks for holding medical imaging cassettes and the like and, more particularly, to a rack that holds exposed medical imaging cassettes in a manner that readily allows manual removal of the cassettes in a first-in, first out order.

BACKGROUND OF THE INVENTION

In radiology departments, "x-rays" or similar medical images are often taken of a region of a patient's body, where the body part of interest is positioned between a source of x-radiation and an x-ray image detector. A latent image of the desired region is first captured on an x-ray detector, traditionally film having an emulsion of silver halide which is sensitive to x-radiation. The film is contained within a rigid, protective, light tight cassette which is openable to remove film for processing once exposed to radiation.

Chemical processing of film is required. Film is manually removed from cassettes in darkrooms and introduced into processors which chemically develop films to produce the desired diagnostic images. A new film is place into cassette, in preparation for subsequent exposure.

"Daylight" processors were developed eliminating the need for darkrooms. The daylight processors automatically remove film from a cassette inserted therein and chemically process and replace new film in the cassette. The cassette is then ejected from the processor for removal and subsequent reuse. The next cassette to be processed would then be inserted into the daylight processor.

Digital Radiography emerged in the latter $20^{th}$ Century. There are two branches of Digital Radiography. Computed Digital Radiography (CR) and Direct Readout (DR) Digital Radiography.

Computed Radiography (CR) is rapidly replacing conventional silver halide film based x-ray. CR utilizes a reusable medium (e.g., a photostimulable phosphor (PSP) embedded in an imaging plate (IP)). The IP is housed in a protective cassette and of the same size as the cassettes used with film. Once introduced into automatic PSP readers, the cassettes are opened or uncovered sufficiently to access the imaging plates for processing. The imaging plates are laser scanned and made available for viewing, printing and archiving through modern computer imaging technologies. The imaging plates are erased and replaced in the protective cassettes and ejected automatically, thus being made ready for reuse.

By replacing film technology, CR eliminates the need for chemicals, waste product recovery and recycling, film transport, and archiving expenses encountered with film.

The digital images can be enhanced with features similar to conventional image-processing software, where image parameters such as contrast, brightness, filtration, and zoom may be manipulated. In addition, since CR uses the same cassette sizes used with film, it is compatible with existing x-ray exam room equipment, thus making transition to digital technology less costly.

Most recently, Direct Readout (DR) digital radiography has emerged to capture a growing share of the diagnostic imaging market. In DR, detector arrays are utilized to capture a desired latent radiological image. The detector arrays are built into x-ray exam room equipment and "hard wired" to electronic devices. By using several different technologies, the desired images are extracted and digitized.

To its advantage, DR eliminates the need for film, imaging plates and cassettes. However, since DR does not use cassettes it generally can not be used with existing x-ray room equipment. The major disadvantage of DR is the high initial cost of the equipment required to implement the system. Since DR does not use cassettes, no further discussion of DR will be included hereinafter.

When introduced, computed radiography (CR) processors presented as single cassette storage phosphor readers or "single loaders". These devices, still being successfully marketed, require an operator to manually load an exposed cassette into an insertion slot/opening in the device. After the phosphor plate is removed from the cassette by the processor, the latent image is scanned and digitized and the phosphor plate is prepared for reuse (erased) by of exposure to intense light and is then returned to the cassette. Erased cassettes (called "clean" in the trade) are manually removed from the same insertion slot or a separate ejection slot and placed with other "clean" cassettes at a nearby or adjacent computer workstation to be used for preparing cassettes for the next patient exam.

Newer PSP readers eventually were developed. These "multicassette" storage phosphor readers or "multiloaders" incorporate input locations or buffers for receiving exposed cassettes and automate the insertion of cassettes/imaging plates into the readers for processing. Each cassette is ejected automatically to a separate output buffer after processing and erasure render it once again "clean".

When preparing "clean" cassettes for the next exam, each cassette required for the upcoming study can be digitally tagged at a nearby or adjacent workstation with patient and exam information. This embodiment enables more than one examination to be performed concurrently. In both "single" and "multi" loader environments, more than one exam room and x-ray technologist use a centrally located processor. Each processed image, regardless of patient is digitally routed to the correct patient's "digital" file.

With limited workspace in many situations, a problem arises when "clean" cassettes being prepared for the next exam by a user are co-mingled with exposed cassettes awaiting manual insertion into the "single" loaders. The potential of double exposing a cassette already containing a latent image is possible, leading inevitably to repeat exams, additional patient exposure to the effects of ionizing radiation and general disruption of orderly workflow.

Other well-known problems arise when media cassettes are temporarily queued awaiting processing in "single loading" devices.

There is generally great pressure on radiologic technologists or other personnel to return processed images as quickly as possible. A first in, first out (FIFO) queue philosophy is generally established for the processing. The media cassettes may be of different sizes. If they are merely stacked one upon another, it is difficult to maintain processing in a FIFO queue. To do so, the bottom cassette must be withdrawn from the stack of media cassettes, often requiring two hands, one to lift the upper cassettes, while withdrawing bottom cassette with the other hand.

If the bottom media cassette is a small cassette and overlaying cassettes are larger, it is simply easier to remove and process the top cassette on the stack. Even if the bottom cassette may readily be removed, human nature being as it is, it is virtually inevitable that out of sequence cassette processing will, at least occasionally, occur.

Also, using the make shift arrangements typically found in radiology departments, it is not uncommon for cassettes to be dropped and damaged, thereby not only disturbing the processing order but potentially damaging the expensive cassettes.

DISCUSSION OF THE RELATED ART

These problems and others with respect to queuing cassettes in "single loader" environments are not addressed in the prior art.

There are, however, autoloaders for processors wherein cassettes are queued for processing. For example, U.S. Pat. No. 7,482,613 for MULTICASSETTE AUTOLOADER FOR A STORAGE PHOSPHOR READER was issued Jan. 27, 2009 to William C. Wendlandt et al. As may be seen in WENDLANDT et al. FIG. 29, the autoloader includes an input bin 60 for receiving media cassettes, specifically storage phosphor cassettes. Input bin 60 has a lower surface that is sloped downwardly away from its outer edge. Cassettes 66 are placed in input bin 60 and gravity causes them to be moved towards the back of the input bin 60. When a plurality of cassettes is placed in such a bin, the cassette nearest the back wall of this bin will be processed first.

Listed below are several other US patents for multicassette autoloaders similarly employing sloping surfaces in input bins. Cassettes are inserted into processors in vertical or horizontal directions.

In U.S. Pat. No. 7,075,101 B2 (45) issued Jul. 11, 2006 to Iiyama, et al., FIG. 4 shows inclined panels 66 and 68, rollers 100 and 116, gates 70 and 72, input bin 54 and output bin 56. Cassettes are vertically moved into the reader/scanner.

In U.S. Pat. No. 5,340,995 issued Aug. 23, 1994 to Verbeke et al., brackets mounted to a horizontally running conveyor belt convey cassettes. Inclined shelves 32 and 83 are shown in FIG. 2.

U.S. Pat. No. 6,346,714 issued Feb. 12, 2002 to Mueller, et al. uses inclined input and output surfaces at locations 20 and 22 of FIG. 2. Continuous belts with pushing cams attached perpendicularly to belt surface, drive cassettes into the processor for scanning. The belts and cams recycle inside and behind an abutting surface so as to position cams for next cassette in stack to be processed.

Cassettes are automatically fed into processors and conveyed within the processors in a vertical direction along the plane defined by the angle of incline of the input surfaces relative to an abutting upright wall. In the vertical direction, motion is controlled by rollers and gates and gripping devices.

When inserted in a horizontal direction the cassettes are moved along the surface of an abutting back wall by motor driven pushing blocks or continuous or infinitely circulating belts with cassette pushing devices mounted perpendicularly to the belts.

All such movements, other than gravity's force assisting in sliding cassettes down inclined surfaces and vertically into slots, are coordinated by digital controllers which, being updated by sensors and positioning devices, sequence the movement of these motor driven means of cassette conveyance.

U.S. Pat. No. 7,482,613 issued Jan. 27, 2009 to Wendlandt et al. as cited above, uses inclined input surfaces. In one embodiment of the invention cassettes stacked on inclined surface and next in line to be processed may fall into the path of the cassette currently being moved to the desired read location. The brief description section for FIG. 13 indicates a stack separator (226) and its function. Brief descriptions of FIGS. 13 and 15 illustrate input telescoping wall (218) and output telescoping wall (220) indicating their respective functions.

Recently published on Dec. 9, 2009, U.S. patent application Ser. No. 12/171,546; (Hoelzl, et al.) for a multicassette autoloader, moves cassette to be processed in horizontal directions. The cassette is moved by means of a continuous belt with pushing cams mounted perpendicularly to the belt.

The stacked cassettes slide down the inclined surface of the input bin. The first cassette falls into a "trench". Here the cassette is supported by a vertically inclined wall and is moved horizontally along this wall until aligned with an insertion slot. The cassette remains in the "trench" and the imaging plate is extracted and drawn into the reader in a vertical direction for processing before being returned to the cassette which remains in same location in trench.

Occasionally, the cassette next in line in the inclined stack may slide, at least partially, into the path of travel of the cassette being moved in the "trench". Drawing sheet 3 of 7, FIGS. 5A-C and FIGS. 6A-C illustrate this situation in conjunction with their functional descriptions in section [0065] on page 5. The cassette in the "trench" is moved by the pushing cams.

The systems referenced above have presented various embodiments to issues related to conveyance of imaging cassettes and may have achieved certain degrees of success in their particular application.

However, these patents fail to provide a solution suitable for use in radiology installations wherein individual cassettes are manually processed by technicians who must remove individual cassettes from a queue for insertion into a "single" loading processor. It would, therefore, be desirable to provide a cassette storage system that ensured FIFO processing of cassettes and easy withdrawal of the next cassette to be processed, regardless of its size relative to other cassettes in the queue.

In U.S. Pat. No. 5,340,995 issued Aug. 23, 1994 to Verbeke et al., and beginning on line 18 of page 4 of the Summary of the Invention, the advantage of providing automatic cassette loading is deemed preferred over single loading devices. These single loading devices are still marketed. Alternate solutions to certain problems encountered with single loaders have gone unmet and therefore not in the prior art.

SUMMARY OF THE INVENTION

In accordance with the present embodiment there is provided a rack for queuing media cassettes for processing after exposure. The cabinet for the rack has a top and upright rear, right, left, and front supporting walls. The cabinet contains a rack having an inclined bottom surface surrounded by a vertically inclined back and a short front lip. The front, bottom, and back structure define a compartment for receiving and retaining media cassettes. A right end wall closes the right-hand side of the compartment. A short guide stop structure is disposed adjacent the left bottom surface and the left front wall of the compartment. An opening in the short guide stop structure adjacent the back wall allows withdrawal of the media cassette adjacent the back wall.

An extracting mechanism disposed in a space behind the back wall and selectively protruding therethrough allows manual withdrawal of a single cassette upon activation by a manually operated handle. Upon release of the activating handle the withdrawal mechanism returns behind back wall.

The novel rack structure allows creation of a FIFO queue as cassettes are placed onto the rack, the most recently added cassette being furthest from the back wall. The extracting mechanism horizontally withdraws the first media cassette in the queue for processing and the remaining cassettes are drawn towards the inclined back wall by gravity as the lower edges of the media cassettes slide along the sloped bottom surface of the compartment.

It is, therefore, an object of the current embodiment to provide a rack for media cassettes wherein media cassettes are stored vertically in a receiving compartment, the first cassette in the queue being closest to the rear wall of the receiving compartment.

It is another object of the current embodiment to provide a rack for media cassettes wherein a manually-actuated extracting mechanism readily withdraws the media cassette closest to the back wall of the receiving compartment.

It is an additional object of the current embodiment to provide a rack for media cassettes wherein the first media cassette is reliably withdrawn regardless of its size relative to other media cassettes queued in the receiving compartment.

It is a further object of the current embodiment to provide a rack for media cassettes wherein the extracting mechanism is readily and reliably operated with minimal effort.

It is a still further object of the current embodiment to provide a rack for media cassettes wherein the rack may be placed on any convenient horizontal environmental surface or may be placed on a mating stand or cabinet.

BRIEF DESCRIPTION OF THE DRAWINGS

Various objects, features, and attendant advantages of the embodiment selected for disclosure will become more fully appreciated as the same becomes better understood when considered in conjunction with the accompanying drawings, in which like reference characters designate the same or similar parts throughout the several views, and wherein:

FIGS. 4A and 4B are detailed perspective views of a carriage of FIGS. 2, 3A, and 3B with a finger in both a retracted, inactive orientation and a protruding, active orientation respectively;

FIGS. 7A-C are diagrammatic illustrations of side views of a portion of the mechanisms of FIGS. 2, 3A-B illustrating the sequence of restoring the carriage of mechanism 115 to its inactive home position and related part movements.

DETAILED DESCRIPTION OF FIRST EMBODIMENT

Physical Layout

The present embodiment provides a temporary storage rack for radiological media cassettes. The term media cassette as used herein is intended to refer to any cassette containing media that when exposed to X-radiation captures an image of an object placed between an X-ray source and the cassette for exposure thereto. Such cassettes typically contain either an emulsion-bearing film or, a photostimulable phosphor coated substrate. It will be recognized by those of skill in the art that other image capturing mechanisms may be placed into such cassettes. Consequently, the current embodiment is not considered limited to any particular image gathering media. Rather, the current embodiment covers any and all media, currently known, or yet to be discovered, when packaged into similar cassettes.

Media cassettes are typically thin rectangular structures openable to insert and remove X-radiation sensitive media. Such cassettes are available in a range of sizes, typical widely used sizes being 8×10, 10×12, 11×14, and 14×17 inches and corresponding metric sizes. It will be recognized that the current embodiment is not considered limited to any particular mix of cassette sizes.

Figure 1A:
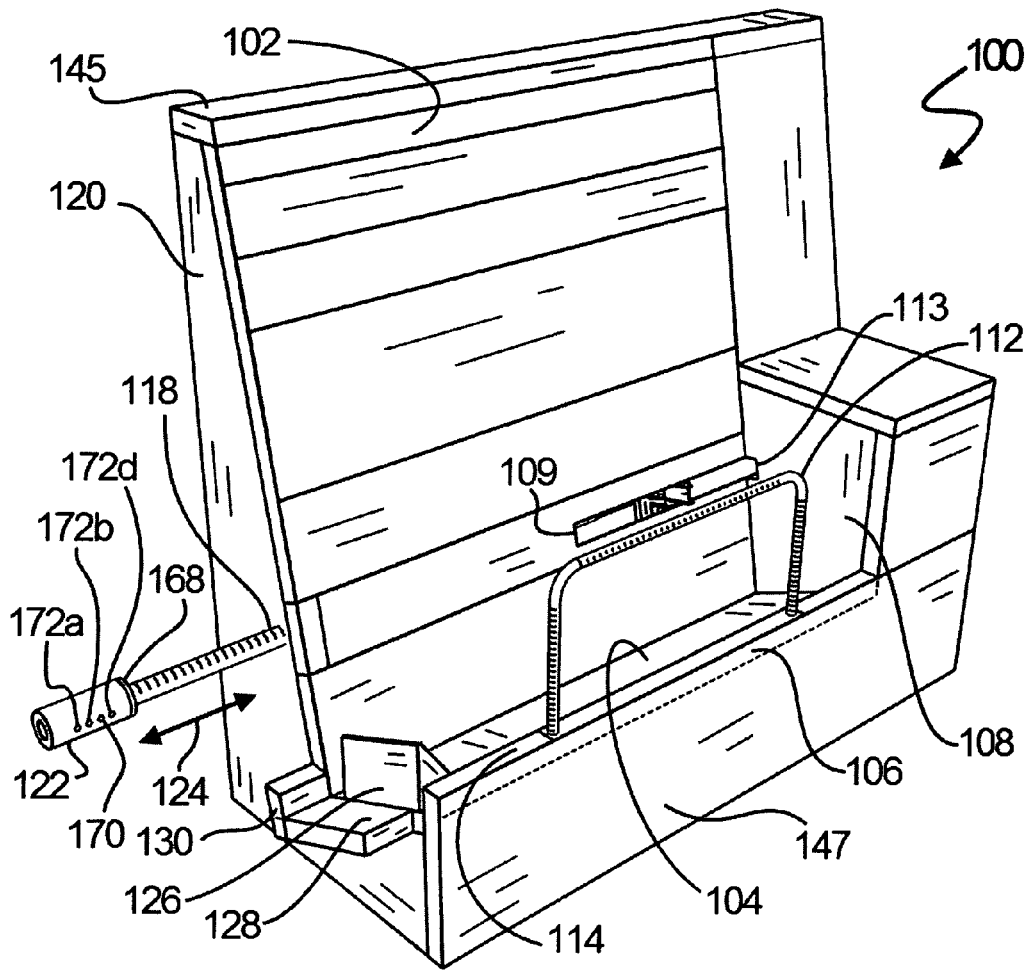
FIGS. 1A and 1B are perspective views of the rack in accordance with the current embodiment unloaded, and loaded with media cassettes, respectively.
Figure 1B:
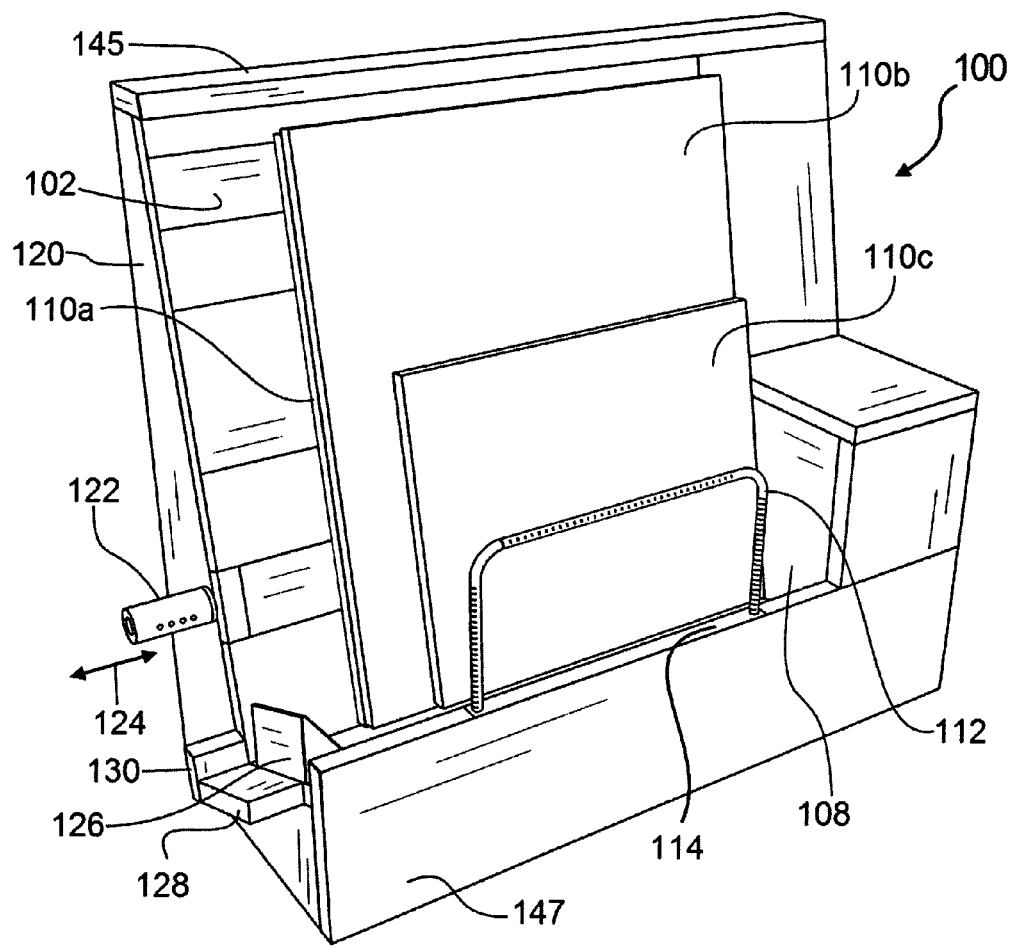

Referring first to FIGS. 1A and 1B, there are shown perspective, schematic views of the media cassette rack of the first embodiment, generally at reference number 100. In FIG. 1A, no media cassettes are present. In FIG. 1B, several media cassettes 110a . . . 110n are loaded therein.

Figure 3A:
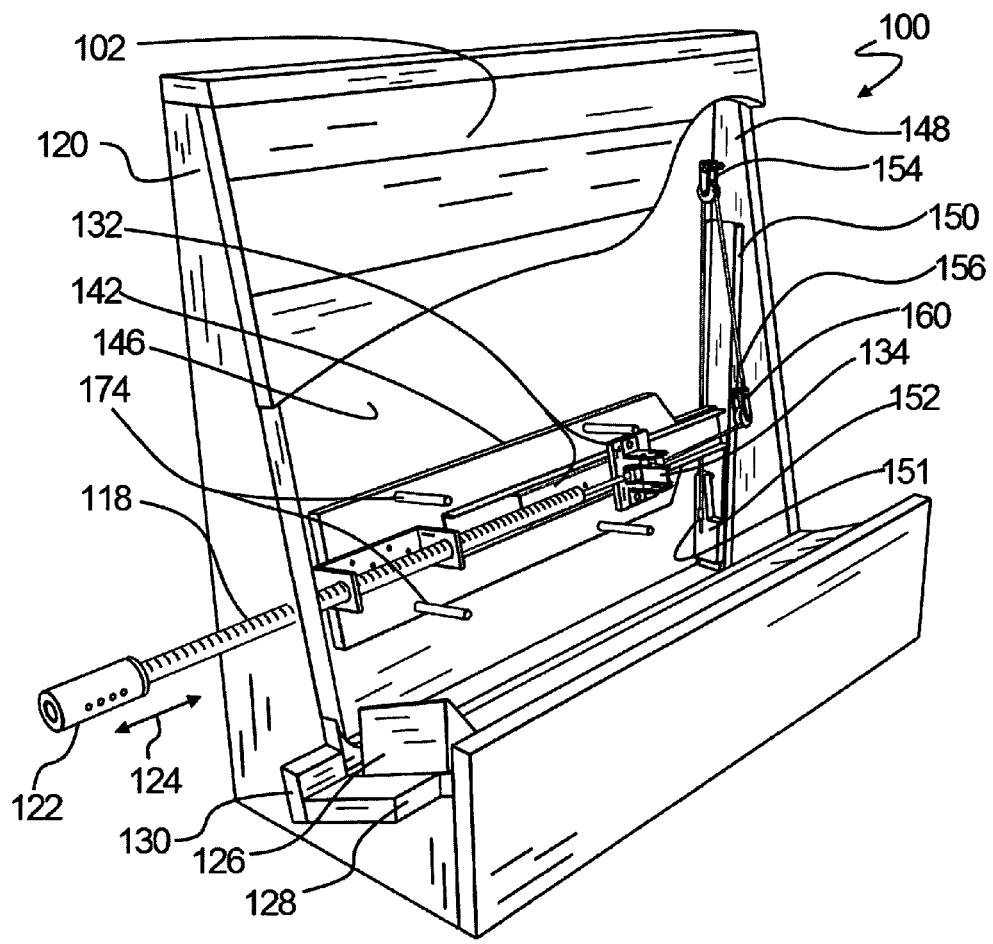
FIGS. 3A and 3B are perspective, schematic views of the mechanism of FIG. 2 mounted with standoffs to the inside of back panel of cassette holding compartment of rack 100 showing a finger in a protruding, active orientation and a retracted, inactive orientation, respectively.
Figure 5:
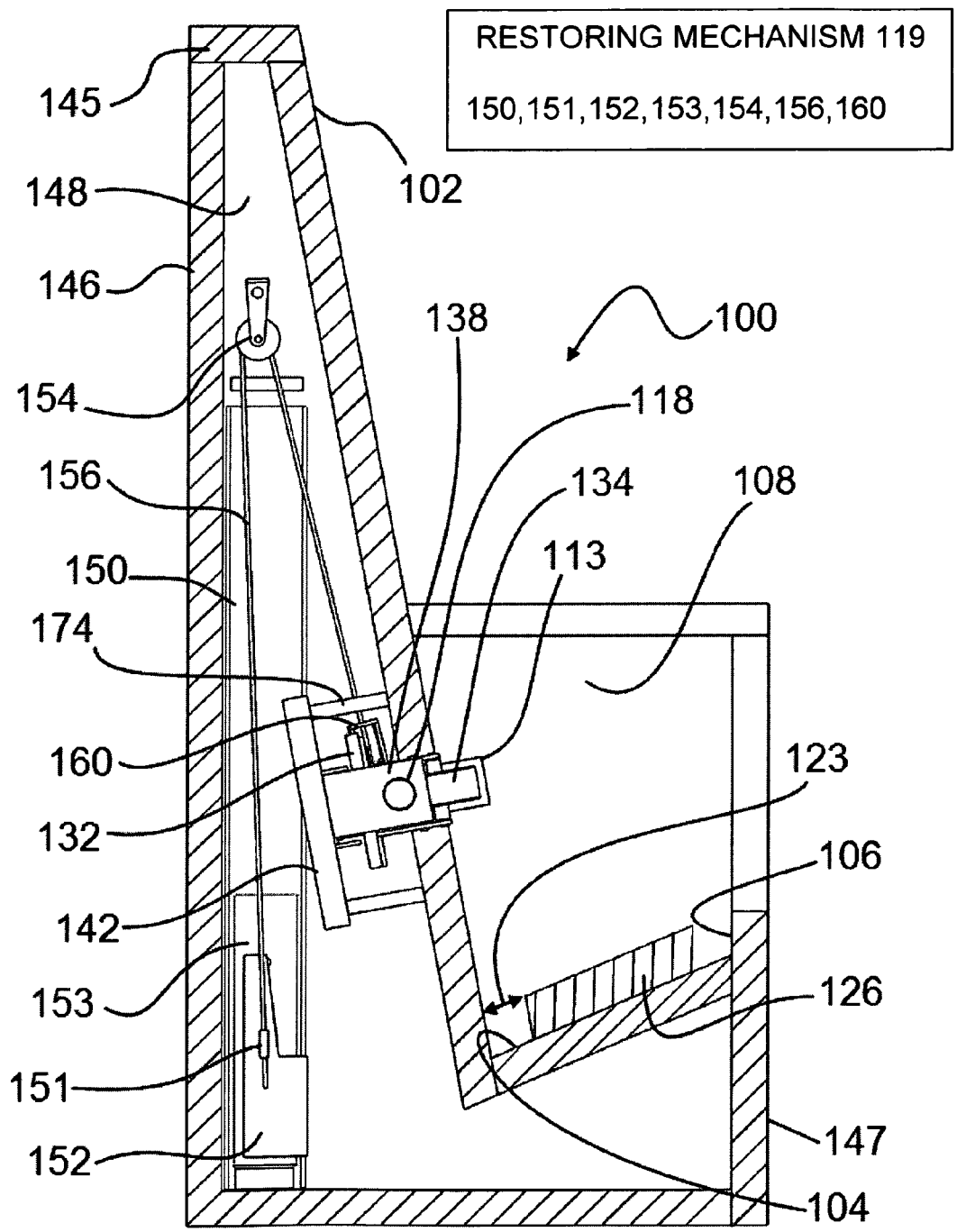
FIG. 5 is a section view along the V-V line through the device illustrated in FIG. 3B, and for clarity contains a legend for a restoring mechanism 119 listing illustrated parts comprising the mechanism.

The cabinet of rack 100 is comprised of a supporting left end wall 120, a front wall 147, and a top closure 145. A cabinet rear wall 146 and a cabinet right side wall 148 are best indicated in FIGS. 5 and 3A.

Rack 100 has a compartment for receiving, retaining, and releasing media cassettes formed by a vertically inclined back 102, a sloping bottom 104, a short front lip 106, and a right end panel 108. A left guide stop 126 is attached to bottom 104 at a left edge thereof. Short front lip 106 is an upward extension of cabinet front wall 147.

A distance from right end panel 108 to the rightmost lower edge of left guide stop 126 is predetermined to accommodate the smaller dimension of the face of the largest cassette placed into rack 100. In the example used for disclosure herein, the largest cassette having dimensions of 14×17 inches, would determine the distance, that being approximately 0.5 to 1.0 inch larger than 14 inches (See top view FIG. 9B for clarity).

In FIG. 1A an elongated opening 109 is formed in back 102 starting at right end panel 108. Elongated opening 109 extends leftward from right end panel 108. There is also an opening 113 in right end panel 108 aligned with and perpendicular to opening 109 of back 102. Both openings allow for operation of rack 100 as explained in detailed herein below.

Figure 10:
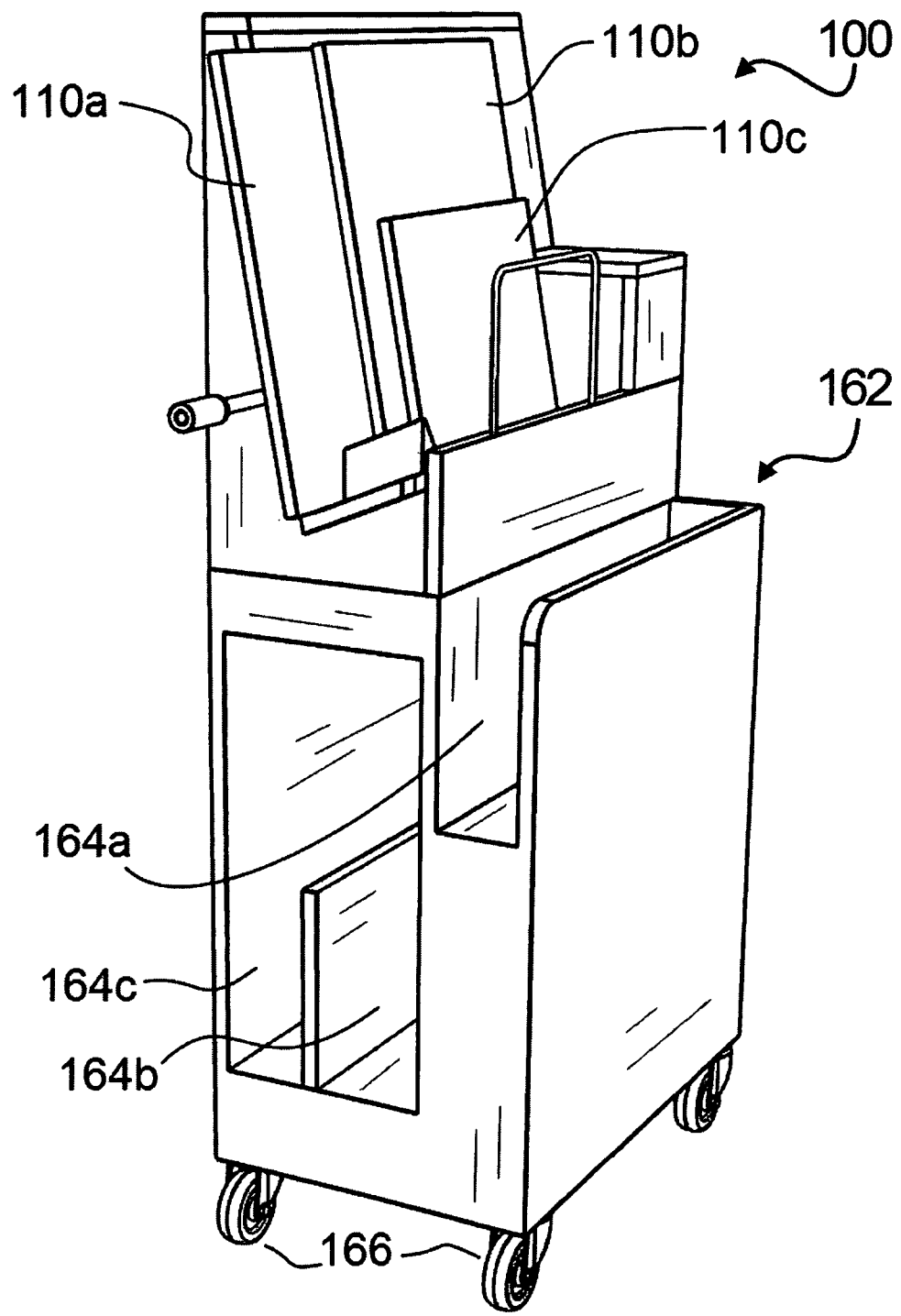
FIG. 10 is a schematic, perspective view of the rack of FIG. 1A containing cassettes and disposed on a mobile cart.

As may be seen in FIG. 1B and FIG. 10, media cassettes 110a, 110b, 110c are placed in rack 100 against inclined back 102. Media cassettes 110a, 110b, 110c form no part of the present embodiment and are shown merely to illustrate the intended use of rack 100. Rack 100 is not considered limited to a particular number of media cassettes 110a . . . 110n that may be placed therein. Rather, the rack 100 includes any number of media cassettes 110a . . . 110n.

As placed in rack 100, media cassettes 110a, 110b, 110c form a first-in, first-out (FIFO) queue, assuming that media cassette 110a is the first to be withdrawn from rack 100.

Rack 100 has a front fence 112 attached to an upper edge 114 of short front lip 106 as seen in FIG. 1A. Lip 106 is also shown in profile in FIG. 5.

Figure 2:
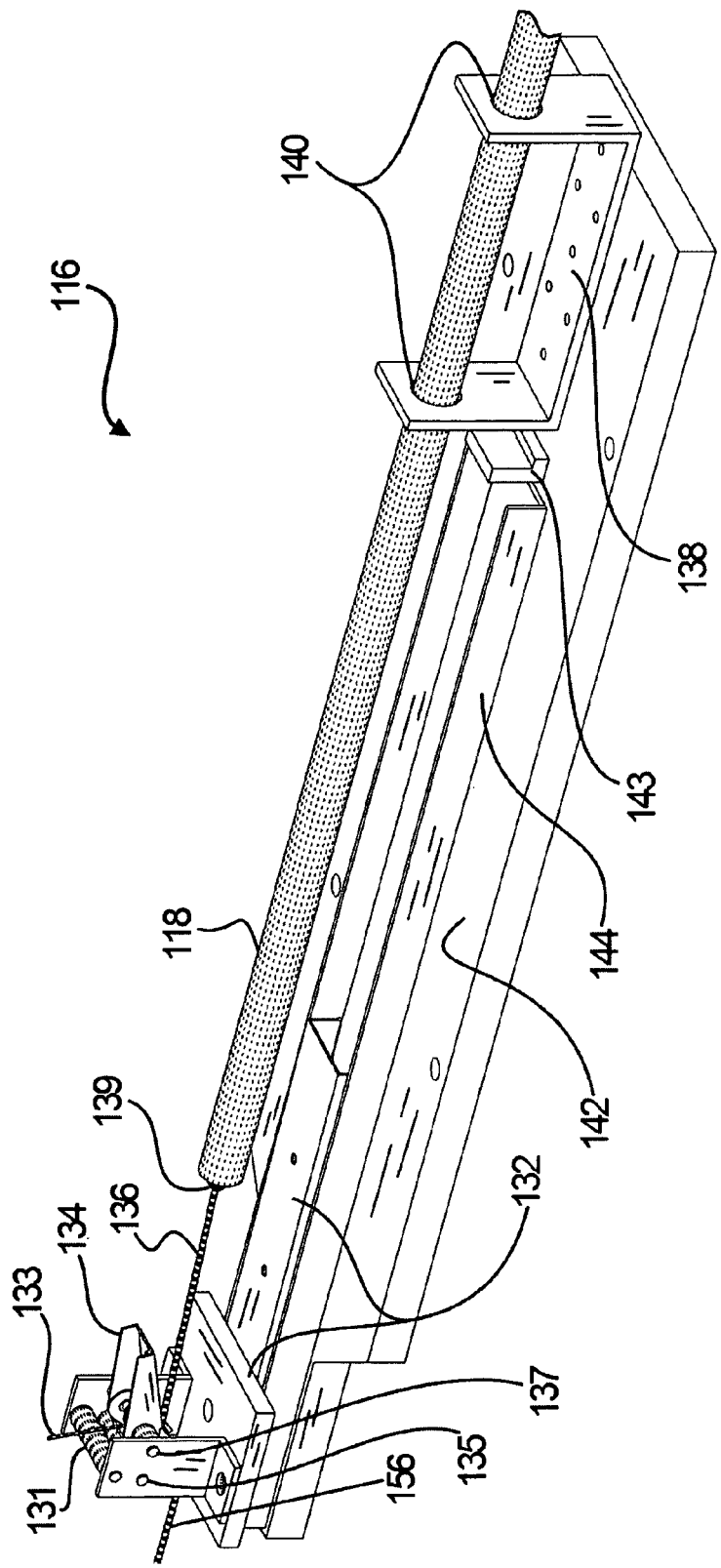
FIG. 2 is a detailed perspective view of a portion of a general mechanism 116 forming a portion of rack 100. For clarity, FIG. 2 includes a legend for an activating mechanism 111 and for an extracting mechanism 115 listing illustrated parts comprising both mechanisms.
Figure 3B:
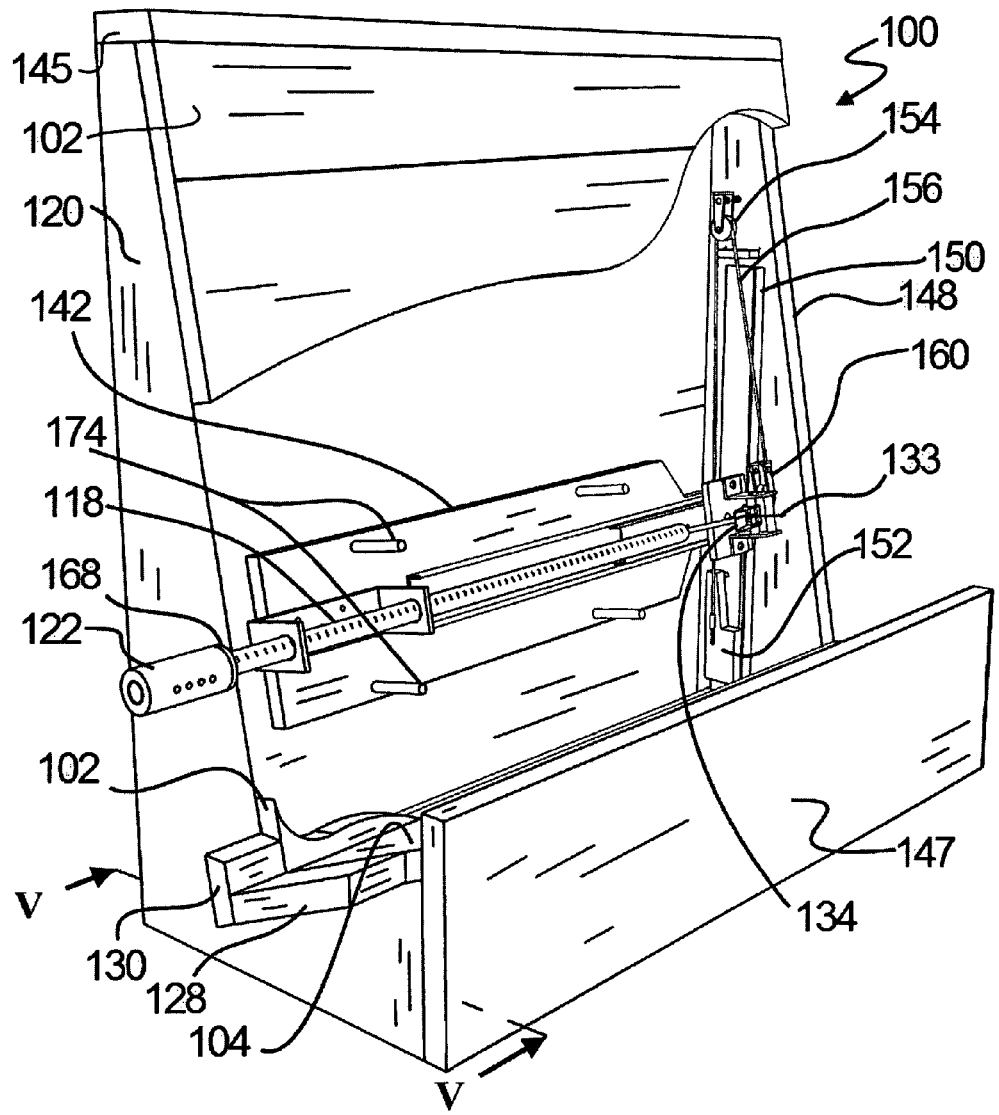

A general mechanism 116, not shown in FIGS. 1A and 1B and best seen in FIGS. 2, 3A, and 3B, is housed in an inner space of rack 100.

In FIG. 1A an activation rod 118 protrudes from left panel 120 and has a handle 122 affixed to a distal end thereof. Handle 122 has a resilient layer 168 on the end with which rod 118 passes through panel 120. Resilient layer 168 is adapted to cushion the impact of handle 122 as it impacts an outer surface of left end panel 120 during the return of rod 118/handle 122 as discussed in detail hereinbelow.

Handle 122 is adapted for selective securement to rod 118. In the embodiment chosen for purposes of disclosure, a setscrew 170 may be secured in any one of a plurality of holes 172a . . . 172n in rod 118. It will be recognized that other methods and/or mechanisms believed to be known to those of skill in the art may be utilized to effect adjustable attachment of handle 122 to rod 118. Consequently, the current embodiment is not considered limited to the attachment mechanism chosen for purposes of disclosure. Rather, the current embodiment includes any other suitable attachment means in addition to the setscrew/holes mechanism chosen for purposes of disclosure.

The adjustable placement of handle 122 on rod 118 allows adjusting a pre-bias/tension on a finger 134 of rack 100 when handle 122 is in a "home" position against left end panel 120. Pre-biasing may be accomplished by adapting alternate components to perform same function as will be discussed hereinbelow. Handle 122, not shown in FIG. 2 further comprises activation mechanism 111.

An arrow 124 illustrates the possible motion of handle 122 and activation rod 118. The construction and operation of activation rod 118 is described in detail hereinbelow.

A left guide stop 126 is attached to bottom 104 at a left edge thereof. Left guide stop 126 typically has an inclined top surface adapted to urge media cassettes 110a . . . 110n into rack 100. Left guide stop 126 is positioned such that a gap (Arrow 123 of FIG. 5) remains between an inward end of left guide stop 126 and inclined back wall 102. The gap is sized to allow passage of only cassette 110a therethrough when cassette 110a is withdrawn from rack 100.

A bottom extension ledge 128 extends bottom 104 outward beyond an outer surface of left end panel 120.

A back extension 130 extends back 102 outward beyond an outer surface of left end panel 120.

To facilitate smooth operation of rack 100 as is discussed in detail hereinbelow, a friction reducing surface on sloping bottom 104 and/or back 102 is advantageous in facilitating movement of media cassettes 110a . . . 110n on those respective surfaces. A polymeric building material known as Fiberglass Reinforced Polymer (FRP) or a texturized metal having similar surface characteristics may be used.

In alternate embodiments, a plurality of raised ridges may be disposed on bottom 104 and/or back 102. In still other embodiments, a low friction coating, for example PTFE (polytetrafluoroethylene) may be placed on either a texturized or ribbed surface of bottom 104 and/or back 102. It will be further recognized that one or more of the aforementioned treatments may used on other surfaces (i.e., inclined top surface of left guide stop 126) of rack 100 that cassettes 110a . . . 110n may contact. It is believed that such materials and surface treatments are well known to those of skill in the art and are not further discussed herein.

Referring now also to FIG. 2, there is shown a detailed perspective view of a portion of general mechanism 116. Legends for extracting mechanism 115 and activating mechanism 111 including comprising part reference numbers illustrated in FIG. 2 are included for clarity.

A carriage 132 disposed to slide across back 102 parallel thereto slides in a track 144. Hingedly mounted on carriage 132 is a finger 134, selectively movable between a protruding, active orientation and a retracted, inactive orientation. In its protruding, active orientation, finger 134 protrudes through opening 109 of back 102 while in its inactive orientation, finger 134 is located behind a front surface of back 102.

Carriage 132 of extracting mechanism 115 is operatively connected to rod 118 of activating mechanism 111 by means of a linkage cable 136. One end of cable 136 is connected with a T-swivel connector 139 at proximal end of rod 118 (see also FIGS. 2 and 6) and the opposite end of cable 136 is connected to the lower leg of finger 134 with T-swivel connector 139. (Best seen in FIG. 4B).

A support structure 138, containing bearings 140, supports rod 118 and further comprises activating mechanism 111 (FIG. 2).

Track 144 slidably supporting carriage 132, and support structure 138 are rigidly affixed to a support plate 142. A carriage stop 143 is adjustably mounted in the linear path of carriage 132 on support plate 142.

Referring now also to FIGS. 3A and 3B there are shown two perspective, schematic views of general mechanism 116 mounted to inner surface of sloping back 102 of rack 100. Standoffs 174 are used to offset mechanism 116, specifically support plate 142 from an inner surface of sloping back 102. (See FIG. 5 for profile view) It will be recognized that fasteners, not shown, may be used to attach outer ends of standoffs 174 to sloping back 102. Such fasteners and methods of using same are believed to be well known to those of skill in the art and are, consequently, not further discussed herein.

In FIG. 3A, finger 134 is disposed in a protruding, active orientation while in FIG. 3B; finger 134 is disposed in a retracted, inactive orientation.

A restoring cable 156 attached to carriage 132 by an adjuster/fastener 151 (FIGS. 4B, 6C, 7A, and 11) may be used to adjust minor fluctuations in length of cable 156. Restoring cable 156 passes around a lower pulley 160 and, subsequently, around an upper pulley 154. A connector/length adjustment 151 (FIGS. 3A and 5), connecting cable 156 to a counterweight 152 may be used to position counterweight 152 relative to cable 156.

Upper pulley 154 is mounted with a bracket (not shown) to an inner surface of a right endwall 148 with its axis of rotation perpendicular to right endwall 148 and offset a distance from endwall 148 so as to align with lower pulley 160 similarly mounted to inner surface of sloping back 102. (See Also FIG. 5)

Counterweight 152 is mounted on a carriage 153 (FIG. 5) and together are slidably positioned in a vertical track 150 which is attached to the inside of a cabinet right side panel 148.

Referring now also to FIGS. 4A-B, there are shown detailed, perspective views of carriage 132 slidably situated in track 144 on support plate 142 with finger 134 in inactive and active orientations respectively.

In FIGS. 4A-B activation rod 118 is operatively linked through a cable 136 to the lower angled leg of finger 134 with T-swivel connector 139. Another T-swivel connector 139 attaches cable 136 to the proximal end of rod 118 (SEE FIGS. 6A-C and 7A-C).

In FIG. 4A, finger 134 is hingedly mounted about a mounting pin 137 of carriage 132 with a return spring 133 also mounted about pin 137 and centrally positioned within the sides of finger 134. The legs of return spring 133 are in tensioned contact between an active finger stop 131 and an inner surface of the upper leg of finger 134.

An inactive finger stop 135 is positioned beneath stop 131 on carriage 132. With finger 134 in the retracted/inactive orientation of FIG. 4A, the back surface of the lower leg of finger 134 (indicated by arrow 129 in FIGS. 6B-C) is in contact with inactive finger stop 135.

In FIG. 4B, finger 134 is shown in protruding/active orientation. The rear facing edge of the upper leg of finger 134 is in contact with active finger stop 131.

Arrow 125 indicates direction of force applied through rod 118. Restoring cable 156 is shown attached to rear of carriage 132 by connector 151.

FIG. 5, a section view along the V-V line through the device illustrated in FIG. 3B, reveals components internal to rack 100 in a simplified view. Handle 122 and left endwall 120 of FIGS. 1A-B and 3A-B are not shown. Front cabinet wall 147, short lip 106, rack bottom 104, rack back 102, a cabinet top 145 and a cabinet rear upright wall 146 are show in profile. Left guide stop 126 is positioned on rack bottom 104 with space between stop 126 and back 102 indicated by arrow 123.

The inner surface of right cabinet wall 148 is shown to which upper pulley 154 and vertical track 150 are mounted. Counterweight carriage 153 is slidably mounted to track 150. Cable adjuster/fastener 151 is attached to counterweight 152 and together are mounted on carriage 153. Restoring cable 156, attached at adjuster/fastener 151 runs up and over pulley 154 and down at angle and around lower pulley 160. For clarity, FIG. 5 includes a legend enumerating the reference numbers of restoring mechanism 119 cited above in this paragraph and illustrated in FIG. 5.

Support plate 142, shown in endview profile, is aligned to mount with standoffs 174 to inside surface of back 102. Mounted to support plate 142 is rod support bracket 138. Endview of rod 118 is shown in position through bracket 138. Finger 134 of carriage 132, is in protruding, active orientation. Finger 134 is shown protruding above the surface of back 102 and is aligned with opening 113 in right end panel 108.

In the embodiment chosen for purposes of disclosure, sloping back 102 is inclined approximately 100° and bottom 104 is inclined approximately 15° relative to a horizontal surface upon which rack 100 may be placed. It will be recognized that alternate angles of inclination may be chosen to meet a particular operating circumstance or environment. Consequently, this first embodiment is not limited to the inclination of approximately 100° of sloping back 102 and 15° of bottom 104 chosen for purposes of disclosure.

Rack 100 may be constructed as a stand-alone unit for placement on any suitable horizontal environmental surface, not shown. However, rack 100 may be paired with a mobile cart 162 of suitable dimensions as shown in FIG. 10. By arranging suitable storage spaces 164a, 164b, 164c, the utility of rack 100 may be enhanced. Casters 166 allow cart 162/rack 100 to readily be moved. Typically, one or more of casters 166 may be equipped with brake mechanisms, not shown, so that movement of cart 162 may selectively be facilitated or hindered as required.

For clarity, legends on drawing sheets 3 and 7 enumerate numbered parts for activating mechanism 111, extracting mechanism 115 and restoring mechanism 119 as follows.

Activating mechanism 111 comprises activation rod 118, cable/linkage 136, support structure 138, Swivel T-connectors 139, rod bearings 140 and handle 122.

Extracting mechanism 115 comprises active finger stop 131, carriage 132, return spring 133, finger 134, inactive finger stop 135, mounting pin 137, carriage stop 143, and carriage track 144.

Restoring mechanism 119 comprises vertical track 150, fastener/adjuster 151, counterweight 152, counterweight carriage 153, upper pulley 154, restoring cable 156, and lower pulley 160.

Detailed Description of First Embodiment

Operation

In operation, carriage 132 carrying finger 134 is free to move laterally along track 144. Carriage 132 has a home position that is to the right of the right extreme of elongated opening 109 (FIG. 1A) with finger 134 in a retracted, inactive orientation (FIG. 3B). In the retracted, inactive orientation of FIG. 4A, the back surface of the lower leg of finger 134, as indicated by arrow 129 in FIGS. 6B and 6C is held in position against inactive finger stop 135 and by the force of return spring 133. In this home position, finger 134 is disposed to the right of right end panel 108 and therefore to the right of the right-hand edge of any media cassette 110a ... 110n in rack 100. (FIG. 1B)

As media cassettes 110a-110c, as illustrated in FIG. 1B are placed on rack bottom 104 of rack 100, the lower edges of the media cassettes 110a-110b drawn by gravity, slide along the surface of sloped bottom 104. Cassettes 110a-110c come to rest against the surface of angled back 102. The first cassette placed in rack 100, cassette 110a is positioned against back 102.

As activation rod 118 and handle 122 are pulled outwardly (i.e., leftward) away from rack 100 (FIG. 1A), a linear force is applied in direction of arrow 125 through activation cable 136 to the lower leg of finger 134 in the retracted, inactive position of FIG. 4A. The linear force causes finger 134 to rotate about mounting pin 137 until its rotation is stopped when the upper leg of finger 134 contacts active finger stop 131, as seen in FIG. 4B.

The rotation of finger 134 about pin 137 causes compression of spring 133. The force to compress spring 133 is less than the force required to move carriage 132 which is operatively connected through restoring cable 156 and around pulley 160 and over pulley 154 to counterweight 152.

Once the rotation of finger 134 is stopped by active finger stop 131, the linear force applied in direction of arrow 125 is applied to carriage 132 and conditions for carriage 132 movement are established. Carriage 132 is pulled to the left and finger 134 now in its protruding, active orientation passes through opening 113 in right end panel 108 (FIG. 1A).

Figure 8:
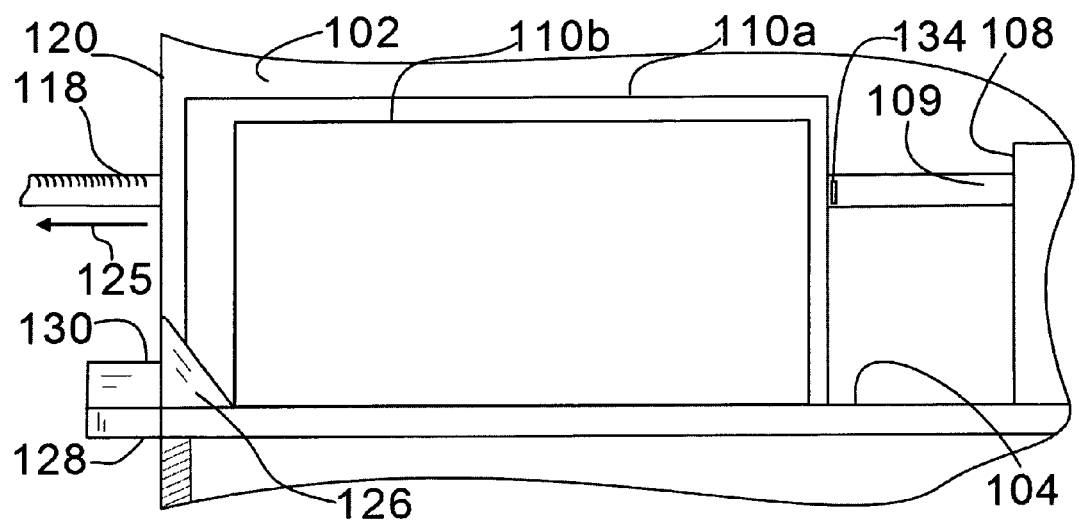
FIG. 8 is a diagrammatic schematic front view illustrating features of the short guide stop structure of the present embodiment.

As carriage 132 is pulled further leftward, finger 134, protruding through opening 109 beyond and perpendicular to the front surface of back 102 (FIG. 1A), eventually engages the right-hand edge of the rearmost media cassette 110a (also FIG. 8). Finger 134 protrudes beyond the front surface of back 102 approximately ⅜ths of an inch to insure contact with the edge of cassette in position of 110a exclusively. Typical thicknesses of narrow edge of media cassettes are approximately ½ inch.

Further leftward motion of carriage 132/finger 134 moves media cassette 110a leftward away from right end panel 108. The leading edge of media cassette 110a approaches and eventually protrudes beyond left end panel 120 where it is supported by bottom extension ledge 128 and guided by back extension 130 (FIG. 1B). Eventually, the outer edge of media cassette 110a may be grasped by an operator and fully extracted from rack 100 (FIG. 10). A further explanation of this sequence of extraction of cassette 110a will be described with FIGS. 6A-C hereinbelow.

Before withdrawing media cassette 110a, force is removed from handle 122/rod 118, logically freeing hand used to pull handle 122. Finger 134 immediately returns to a retracted, inactive orientation, as explained below in description of FIGS. 7A-C so that it may readily pass behind media cassette 110b which may have, at least partially at its right vertical edge, fallen by gravity against the surface of back 102. FIG. 9B shows a cassette 110b with right vertical edge in contact with the surface of back 102.

Counterweight 152, acting through restoring cable 156, then restores carriage 132 to its home position.

Once media cassette 110a is removed from rack 100, media cassette 110b, pulled downward and backward by gravity along sloping bottom 104, moves into the space originally occupied by media cassette 110a against back 102.

Figure 6A:
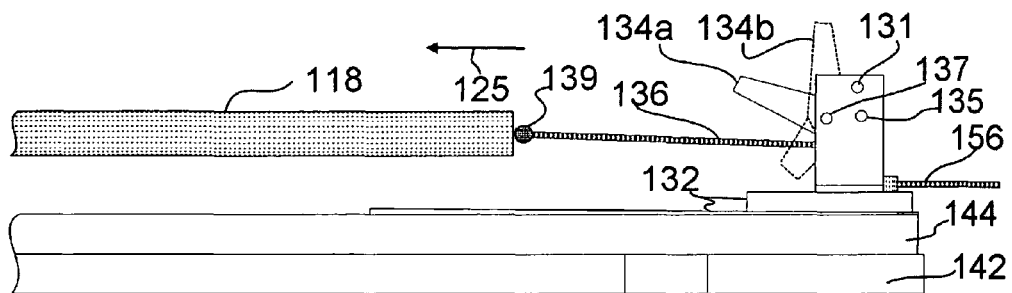
FIGS. 6A-C are diagrammatic illustrations of side views of a portion of the mechanisms of FIGS. 2 and 3A-B illustrating a sequence of cassette extraction and selective part movements.
Figure 6B:
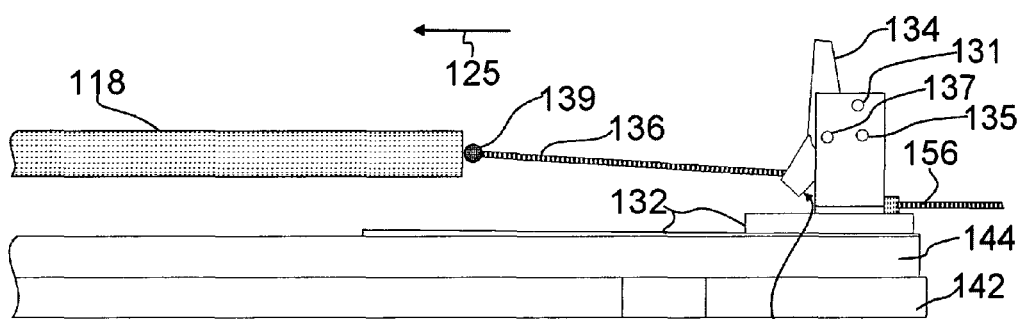
Figure 6C:
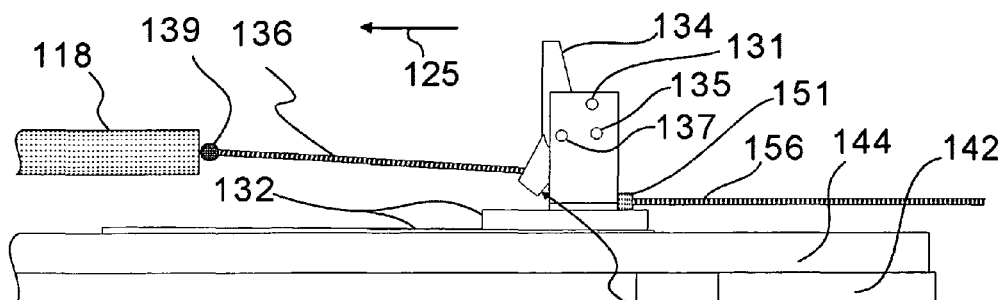

In FIG. 6A-C an extraction sequence is schematically illustrated following in order A through C.

FIG. 6A shows finger 134 in orientations 134a and 134b. Finger orientation 134a exists until the effects of pre-bias set by handle 122 take effect. The adjustable placement of handle 122 on rod 118 allows adjusting a pre-bias on finger 134 when handle 122 is in a position against left end panel 120 (FIG. 1B). This pre-bias is represented by finger 134b orientation.

The home position of carriage 132 and finger 134 is to the right of end wall 108 where finger 134 in the orientation of finger 134b can not come in contact with any cassettes in rack 100. Upon drawing handle 122 (not shown) in the direction of arrow 125, a lag felt by a user if finger 134 were in orientation 134a is advantageously minimized by the pre-bias shown in finger orientation 134b.

Return spring 133 is mounted so as to exert a rotational force between inner surface of upper leg of finger 134 and active finger stop 131 of carriage 132 (FIG. 4A).

In FIG. 6B an activating force is applied leftward in the direction of arrow 125. The force applied is transmitted through activation rod 118, cable 136 and T-swivels 139 (See FIGS. 4A-B) to the lower leg of finger 134 and results in further compression of return spring 133 and rotation of finger 134 about pin 137 until motion is stopped by contact with active finger stop 131. Once finger 134 rotation is stopped, the force in direction of arrow 125 is translated to restoring cable 156 attached to right side of carriage 132.

FIG. 6C illustrates carriage motion in direction of arrow 125 with finger 134 in protruding, active orientation as described hereinbefore.

FIGS. 7A-C schematically illustrate the action of carriage 132 and finger 134 after release of pulling force described in FIGS. 6A-B, thus permitting the return of carriage 132 and finger 134 in the direction of arrow 125 to the home position.

Immediately to the right of rod support structure 138, carriage stop 143 is adjustably mounted to plate 142 inline with the linear motion of carriage 132. It is set to stop motion of carriage 132 correspondingly limiting stroke distance of activation rod 118 so as to allow finger 134 to move the smallest of cassettes 110a to a position far enough to the left (against direction of arrow 125) to be manually removed from rack 100. Adjustment in stroke distance may be necessary due to slight dimensional differences of cassettes from various CR system manufacturers.

In FIG. 7A with finger 134 in a protruding orientation and positioned sufficiently leftward to have moved cassette 110a (not shown) beyond an outer surface of left endwall 120 (not shown) the handle 122 (not shown) is released.

Immediately in FIG. 7B, finger 134 rotates to retracted orientation due to the force of return spring 133 (seen in FIG. 4A) acting on finger 134.

Immediately thereafter, in FIG. 7C the restoring action of counterweight 152 returns carriage 132 in the direction of arrow 125 with finger 134 safely in a retracted/inactive orientation below the surface of back 102 to its home position to the right of right endwall 108.

FIG. 7C illustrates finger 134 in finger orientation 134a as it returns safely to the "home" position and in finger orientation 134b after the effects of pre-bias described hereinbefore (see above description for FIG. 6A) take effect. Thereby a pre-bias is set for Finger 134 in advance of the extraction of the next media cassette to be withdrawn from rack 100 commencing with FIG. 6A.

FIG. 8 in a front diagrammatic view illustrates the stopping action of angled endstop 126. For illustration purposes two cassettes 110a and 110b are used.

Occasionally, and more often when a plurality of cassettes greater than two are positioned in rack 100 and cassette 110a is acted upon by finger 134 shown engaged at right edge of cassette 110a, friction from force of cassettes 110c to 110n stacked in order after cassette 110b, will create friction sufficient to move cassette 110b concurrently with cassette 110a in direction of arrow 125.

The left lower corner of cassette 110b shows contact with the lower right angled surface of guide stop 126 and is sufficient to stop cassette 110b from further leftward motion. The angled top/side of left guide stop 126 also functions to urge cassettes being placed into rack 100 toward and onto the sloping bottom 104 of rack 100.

Figure 9A:
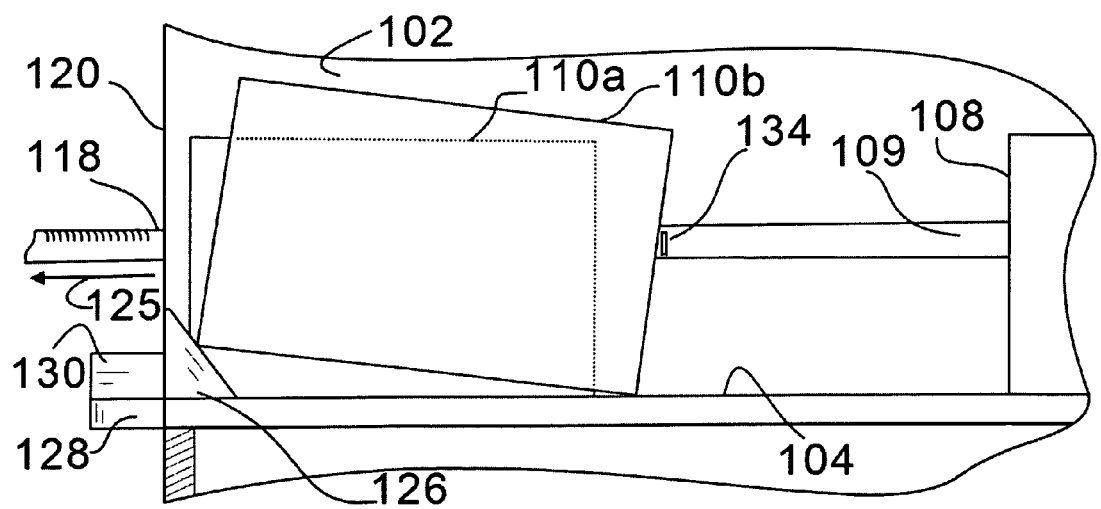
FIGS. 9A-B are front and top diagrammatic views respectively, showing further function of short guide stop.
Figure 9B:
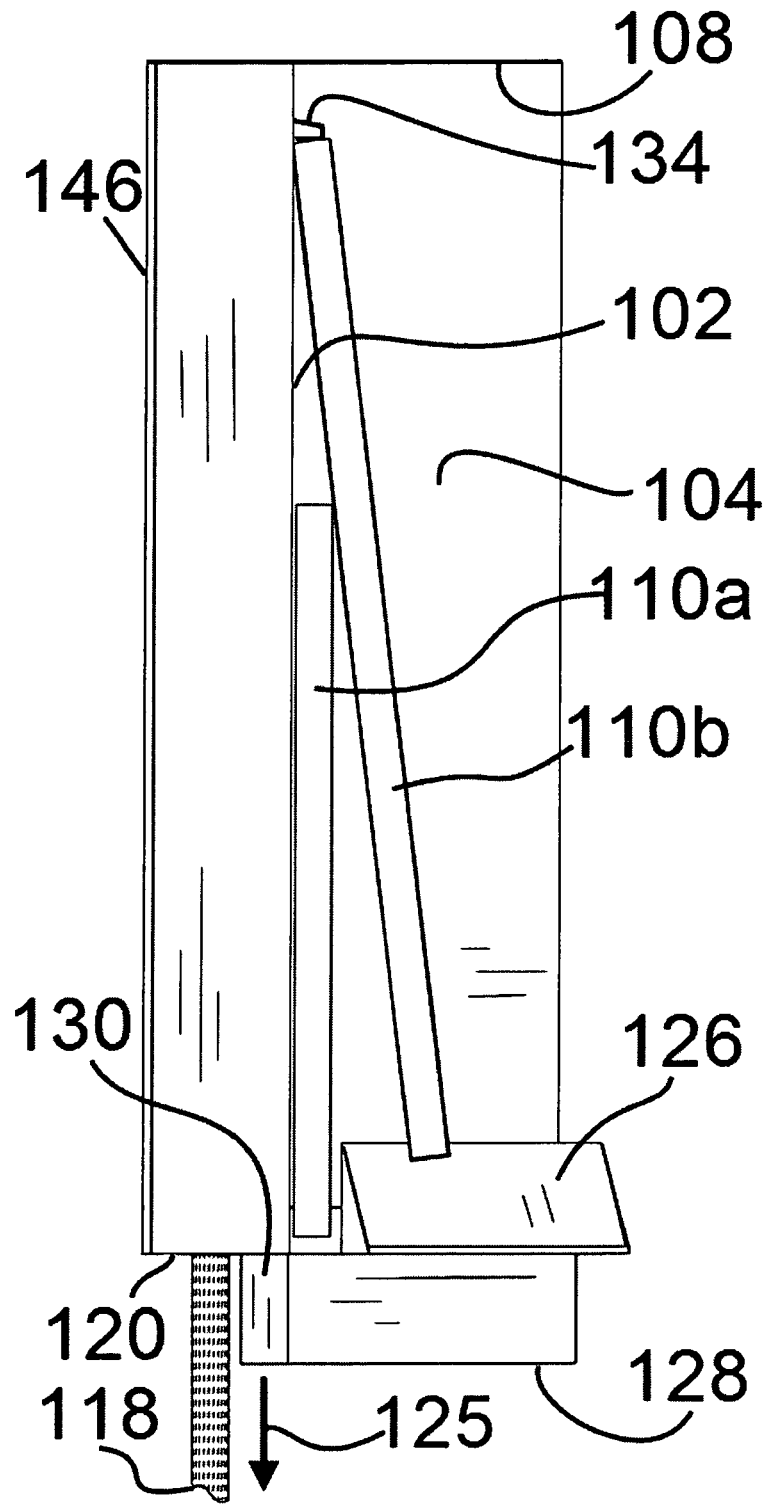

In FIGS. 9A-B front diagrammatic and top diagrammatic views respectively illustrate a situation which may occur, for instance when an operator draws a cassette 110a a certain distance in direction of arrow 125 and then, for a variety of reasons releases handle 122 (not shown) enacting the return sequence of carriage 132/finger 134 described hereinbefore and with respect to FIGS. 7A-C.

In this situation and generally when the smallest of cassettes is in position 110a a side of a larger cassette 110b closest to right end panel 108 may have partially fallen into contact with back 102 due to gravity (see top view FIG. 9B). Upon reactivation of extracting sequence describe earlier with respect to FIGS. 6A-C the edge of obstructing cassette 110b will be driven in direction of arrow 125 by finger 134 until it moves out of the path of finger 134 by a wedging action against cassette 110a or until its leading lower left edge (FIG. 9A) encounters the angled surface of left guide stop 126 and "ramps" up the angled surface until the path of finger 134 is cleared to engage and extract cassette 110a. At this point cassette 110b will slide with gravity to position 110a once cassette 110a is removed by operator.

Alternately in the situation describe above, an attentive operator may once again release handle 122 (not shown) allowing finger 134 to pass safely in retracted position to home position (see sequence described hereinbefore for FIGS. 7A-C). By freeing the hand used to pull handle 122, an operator can manually place misaligned cassette(s) in correct orientation for extraction.

The operation of rack 100 described in detail hereinabove is then repeated when it is time to extract the next media cassette 110a ... 110n from rack 100. Thus, media cassettes 110a ... 110n are withdrawn from rack 100 in a irst in, first out (FIFO) sequence. This operation allows media cassettes to be readily loaded into rack 100 and, subsequently, to be withdrawn one at a time in a FIFO sequence.

Alternate Embodiments

Figure 11:
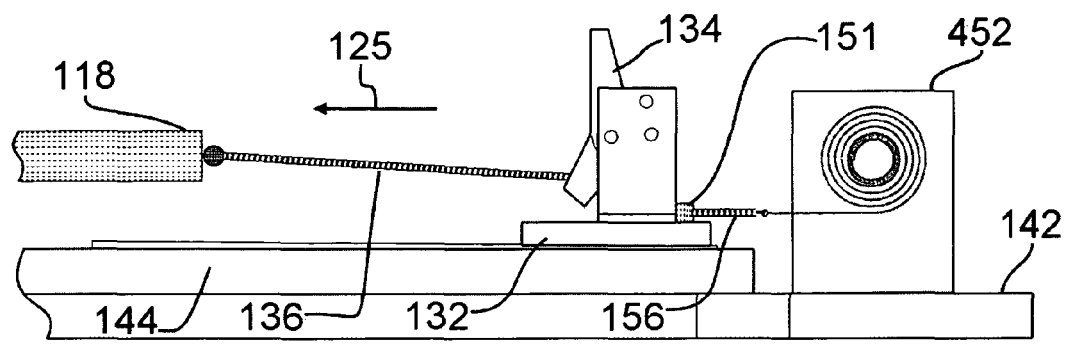
FIG. 11 is a diagrammatic schematic side view of an alternate embodiment of the restoring mechanism 119 of rack 100.

FIG. 11 schematically illustrates an alternate embodiment that would replace counterweight 152 and the operatively related components of restoring mechanism 119 of the first embodiment.

In FIG. 11, a constant force spring/retraction reel 452 effectively replaces the restoring functions of counterweight 152 and operatively related components as described above. A short section of restoring cable 156 connects to restoring reel 452. Cable 136, carriage 132 finger 134, track 144, spring 133 (not shown) and activation rod 118 remain as in first embodiment.

Operation of restoring reel 452 and motion of extraction in direction of arrow 125 to left and motion of restoration in direction opposite to arrow 125 are identical to operational description set forth hereinbefore for first embodiment.

Figure 12A:
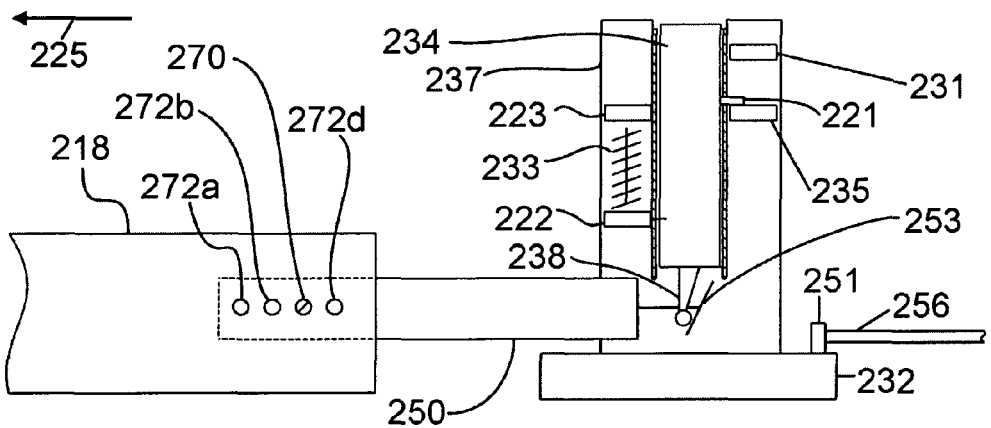
FIGS. 12A-B are diagrammatic illustrations of another alternate embodiment of selected components of rack 100 of the first embodiment.
Figure 12B:
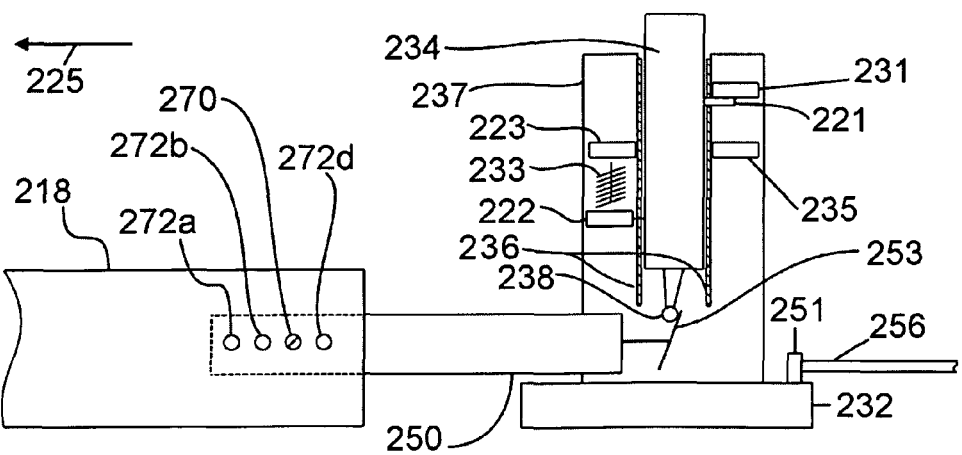

FIGS. 12A-B are diagrammatic illustrations of alternate embodiments of the activation rod 118, linkage cable 136, and carriage 132 of the first embodiment.

FIG. 12A shows a finger 234 in a retracted, inactive orientation. FIG. 12B shows finger 234 in a protruding, active orientation.

A rigid linkage 250 is connected to the end of an activation rod 218 proximal to a carriage 232. A linkage 250 is adapted for selective securement to rod 218 by a setscrew 270 secured in any of a plurality of holes 172a ... 172n in linkage 250. The adjustable placement of linkage 250 to rod 218 allows adjusting a pre-bias to position of finger 234 in its home position and provides and alternate embodiment to the pre-bias set by adjustable placement of handle 122 on rod 118 disclosed hereinbefore in the first embodiment of rack 100.

Linkage 250 is adapted with a helical screw 253 at its end proximal to carriage 232. The leading edge of helical screw 253 is illustrated.

Finger 234 is adapted at its bottom with an extension 238 which is slidably in contact with leading edge of helical screw 253. Fixed in position to a finger assembly housing/mount 237 are a spring mount 223, an active finger stop 231, an inactive finger stop 235, and rails 236 (FIG. 12B). An upper finger tab 221 and a lower finger tab 222 are attached to and move with finger 234. Finger 234 moves along rails 236 between inactive and active orientations. A return spring 233 compresses and decompresses between a fixed spring mount 223 and lower finger tab 222.

In operation a force applied in the direction of an arrow 225 by activation rod 218 urges finger 234 from the retracted, inactive orientation shown in FIG. 12A to the protruding, active orientation shown in FIG. 12B. Continued motion in direction of arrow 225 applies force in direction of arrow 225 to a fastener 251 and a restoring cable 256, thus moving carriage 232 in the direction of arrow 225 to the left and away from a home position.

Upon release of the activation force applied by activation rod 218, return spring 233 decompresses thus causing finger 234 to return to the retracted, inactive orientation and carriage 232 and is restored to its home position.

Upper finger tab 221 stops motion of finger 234 in inactive and active orientations by contact with inactive finger stop 235 and active finger stop 231 respectively.

In yet another alternate embodiment (not illustrated), a compression spring operatively connected to carriage 132 and mounted separately along a linear axis parallel to rod 118 of the first embodiment would provide alternate replacement of counterweight 152 and the operationally related components of the of the first embodiment that function to restore carriage 132 and finger 134 to home position.

Advantages

From the description above, a number of advantages of some embodiments of rack 100 become evident:

By providing a dedicated temporary storage location for exposed cassettes waiting to be processed, co-mingling of exposed and unexposed cassettes is avoided, double exposing a cassette already containing a latent image is avoided, repeat exams and additional patient exposures to the potentially harmful effects of ionizing radiation are avoided and, orderly workflow is enhanced.

Cassettes are easily withdrawn from rack thereby, eliminating makeshift stacking of cassettes, reducing dropping and possible damage to cassettes withdrawn from bottom of stack and, saving time and cassette replacement/repair costs.

Conclusions, Ramifications and Scope

The working environment of x-ray departments using manually loaded processors differs from that of x-ray departments using multiloaders.

As presented in the first embodiment disclosed herein, the manual extraction of a cassette to be inserted for processing into a "single loader", being drawn in one direction for extracting by a movable extracting mechanism which is released to be restored to its home position along the same path is essential to manual operation. This action is made possible by the novel selectively protruding, retracting finger 134 described in operation and detail hereinbefore.

Since other modifications and changes varied to fit particular operating requirements and environments will be apparent to those skilled in the art, the embodiments of rack 100 presented herein are not considered limited to the example chosen for purposes of disclosure or to the alternate embodiments additionally disclosed, and covers all changes and modifications which do not constitute departure from the true spirit and scope of rack 100.

Having thus described the first embodiment of rack 100, what is desired to be protected by Letters Patent is presented in the subsequently appended claims.

Parts List—First Embodiment

100—Cassette rack, general
102—Inclined Back (rack)
104—Sloped bottom (rack)
106—Short front lip (rack)
108—Right end panel (rack)
109—Opening in back 102 for finger 134 to protrude (rack)

110a . . . 110n—Media cassettes
111—Activating mechanism
112—Front fence (rack)
113—Opening in right end panel 108 (rack)
114—Upper edge of short front lip (rack)
115—Extracting mechanism
116—Mechanism, general (rack)
118—Activation rod (activating mechanism)
119—Restoring mechanism
120—Cabinet left end support wall/panel
122—Handle (activating mechanism)
123—Arrow—indicates space between 102 and 128
124—Arrow bi-directional
125—Arrow single direction
126—Left guide/stop (rack)
128—Bottom extension ledge (rack)
129—Arrow—specific location on numbered component.
130—Back extension (rack)
131—Active finger stop (extracting)
132—Carriage (extracting)
133—Return spring—torsion (extracting)
134—Finger (extracting)
135—Inactive finger stop (extracting)
136—Cable/linkage (activating mechanism)
137—Mounting pin for finger 134, spring 133 (extracting)
138—Rod support structure (activating mechanism)
139—Swivel T-connector (activating mechanism)
140—Rod bearings (activating mechanism)
142—Support plate (general mechanism)
143—Carriage stop (extracting mechanism)
144—Carriage track (extracting mechanism)
145—Cabinet top
146—Cabinet rear support wall/panel
147—Cabinet front support wall/panel
148—Cabinet right side support wall/panel
150—Vertical track (restoring mechanism)
151—Fastener/adjuster (restoring mechanism)
152—Counterweight (restoring mechanism)
153—Counterweight carriage (restoring mechanism)
154—Upper pulley (restoring mechanism)
156—Restoring cable (restoring mechanism)
160—Lower pulley (restoring mechanism)
162—Cart
164a . . . 164n—Storage spaces in cart 162
166—Casters
168—Resilient layer (activating mech.)
170—Set screw (activating mechanism)
172—Holes (activating mechanism)
174—Standoff mountings for mechanism 116

Parts List—Alternate Embodiments

218—Activation rod (activating mechanism)
221—Upper finger tab (extracting mechanism)
222—Lower finger tab (extracting mechanism)
223—Spring mount (extracting mechanism)
225—Arrow
231—Active finger stop (extracting mechanism)
232—Carriage (extracting mechanism)
233—Return spring—compression (extracting mechanism)
234—Finger (extracting mechanism)
235—Inactive finger stop (extracting mechanism)
236—Rails (extracting mechanism)
237—Finger housing/mount (extracting mechanism)
238—Bottom finger extension (extracting mechanism)
250—Linkage (activating mechanism)
251—Fastener/adjuster (restoring mechanism)
253—Helical screw leading edge (activating mechanism)
256—Restoring cable
270—Set screw (activating mechanism)
272—Holes in linkage shaft
452—Constant force spring/retraction reel (restoring)

What is claimed is:

1. A rack for receiving, storing, and allowing withdrawal of media cassettes in a first in, first out (FIFO) sequence, comprising:

a) a cabinet having a media cassette receiving region comprising a sloping bottom, a vertically inclined back, and a right side panel, said inclined back having a horizontally disposed elongated opening originating at said right side panel, said right side panel having an opening continuous with and perpendicular to said opening of said inclined back, said media cassettes having a common dimension of thickness and a plurality of standard face dimensions, said receiving region holding a plurality of said media cassettes when placed face to face on edge therein, said plurality of cassettes urged by gravity to stack against said inclined back with a major surface of a first cassette to be withdrawn resting against said inclined back; and b) an extracting mechanism disposed behind said inclined back comprising a spring, a finger, and a carriage movable from side to side parallel to a major axis of both said sloping bottom and said inclined back, said carriage carrying said finger, loaded by said spring, said spring loaded finger movable between a retracted, inactive orientation and a protruding, active orientation, wherein said retracted, inactive orientation said finger is disposed completely behind a front surface of said back, wherein said protruding, active orientation said finger is protruding through said elongated opening of said back and beyond said front surface of said back, wherein said carriage is moveable in a leftward direction only after said finger is moved to said protruding, active orientation, and said carriage is moveable in a rightward direction only after said spring loaded finger moved to said retracted, inactive orientation; and c) an activating mechanism comprising a rod, and a handle, said rod disposed in an inner space behind and parallel to said inclined back and proximate a left side wall of said cabinet, the distal end of said rod passing through said left side wall, said handle adjustably attached to said distal end of said rod, the proximal end of said handle in contact with the outer surface of said left side wall when said activating mechanism is in a home position, the proximal end of said rod operatively connected to the lower extension of said finger and adapted to cause said finger to assume said active, protruding orientation upon an activating force being applied to said rod in said leftward direction, said activating mechanism further adapted to move said carriage carrying said protruding finger from said home position to the right of said right side panel in a leftward direction, said protruding finger thereby engaging said first cassette to be withdrawn and transporting said cassette along said inclined back toward said left side of said cabinet to a position extending left of said left side wall sufficient for a user to manually withdraw said first cassette from said rack, said finger returning to said retracted, inactive orientation upon release of said activating force applied to said activating mechanism; and d) a restoring mechanism disposed within said cabinet and operatively connected to a right side of said carriage and adapted to exert a force opposing motion of said carriage in said leftward direction, and further adapted to exert a restoring force on said carriage, thereby moving said carriage in a rightward direction to said home position upon release of said activating force, and wherein said restoring mechanism comprises at least one component selected from the group: a counterweight, a pulley, a spring and a cable.

2. The rack for receiving, storing, and allowing withdrawal of media cassettes as recited in claim 1, wherein, said rod of said activating mechanism extending in said leftward direction through and beyond said left side of said cabinet, further including a linkage disposed between said proximal end of said rod and said finger of said carriage, said activating force moving said rod in said leftward direction away from said left side of said cabinet.

3. The rack for receiving, storing, and allowing withdrawal of media cassettes as recited in claim 2, wherein said handle is affixed at said distal end of said rod, and wherein said proximal end of said handle is in contact with said outer surface of said left side of said cabinet when said carriage of said extracting mechanism is in its said home position.

4. The rack for receiving, storing, and allowing withdrawal of media cassettes as recited in claim 1, further comprising:
   e) a general mechanism disposed behind said back of said media cassette receiving region.

5. The rack for receiving, storing, and allowing withdrawal of media cassettes as recited in claim 4, wherein said general mechanism comprises a support plate and standoffs for mounting said support plate a predetermined distance behind an inner surface of said back of said media cassette receiving region, thereby providing clearance for said carriage of said extracting mechanism disposed behind said back to move from side to side parallel to said major axis of both said sloping bottom and said inclined back.

6. The rack for receiving, storing, and allowing withdrawal of media cassettes as recited in claim 1, wherein said extracting mechanism further comprises a track, said track mounted to said support plate parallel to said major axis of both said sloping bottom and said inclined back, thereby slidably accommodating said carriage movably affixed thereto.

7. The rack for receiving, storing, and allowing withdrawal of media cassettes as recited in claim 6, wherein said activating force of said activating mechanism acting on said finger of said carriage in said leftward direction causes said spring to be further compressed beyond a tensioned orientation between said finger and said active finger stop, and whereby the motion of said finger is stopped in said protruding active orientation by contact with said active finger stop.

8. The rack for receiving, storing, and allowing withdrawal of media cassettes as recited in claim 7, wherein said activating force of said activating mechanism being further applied in said leftward direction, moves said carriage in said leftward direction, thereby overcoming said opposing force of said restoring mechanism to resist said movement of said carriage in said leftward direction, and wherein removal of said activating force from said activating mechanism will cause said compressed spring to move said finger from said protruding, active orientation to said retracted, inactive orientation independent of said force being exerted by said restoring mechanism to move said carriage to said home position.

9. The rack for receiving, storing, and allowing withdrawal of media cassettes as recited in claim 7, wherein said restoring mechanism exerts said opposing force to resist said movement of said carriage in said leftward direction with a magnitude in excess of said activating force required to compress said spring and move said finger to said protruding, active orientation against said active finger stop.

10. The rack for receiving, storing, and allowing withdrawal of media cassettes as recited in claim 1 wherein said media cassette receiving region further comprises, a short front lip.

11. The rack for receiving, storing, and allowing withdrawal of media cassettes as recited in claim 1, wherein said media cassette receiving region further comprises a left guide stop, said guide stop is affixed to the left side of said sloping bottom and adjacent to the left side of said short front lip with a gap between said left guide stop and adjacent said inclined back, said gap of predetermined size so as to allow withdrawal of but one media cassette therethrough.

12. The rack for receiving, storing, and allowing withdrawal of media cassettes as recited in claim 1, further comprising:
   f) a fence disposed proximate an upward-facing surface of said front lip.

13. The rack for receiving, storing, and allowing withdrawal of media cassettes as recited in claim 12, wherein said fence is attached to said upward-facing surface of said front lip, thereby vertically extending said front lip of said media cassette receiving region.

14. The rack for receiving, storing, and allowing withdrawal of media cassettes as recited in claim 1, wherein at least one of said sloping bottom and said vertically inclined back have a friction reducing surface on at least a portion thereof.

15. A method of maintaining a first in, first out (FIFO) queue of media cassettes, the steps comprising:
   a) providing a media cassette rack in accordance with claim 1;
   b) placing a first media cassette into said media cassette receiving portion of said rack with a lower edge of said media cassette disposed on said sloping bottom and a major surface of said media cassette disposed against and substantially parallel to said inclined back;
   c) placing a second media cassette into said media cassette receiving portion of said rack with a lower edge of said media cassette disposed on said sloping bottom and a major surface of said second media cassette adjacent a major surface of said first media cassette;
   d) using said activating mechanism to move said finger, carried by said moveable carriage, to said protruding, active orientation, whereby engaging and moving said first media cassette to said position beyond said outer surface of said left side of said cabinet;
   e) releasing said activating mechanism, thereby allowing said spring loaded finger to move to said retracted, inactive orientation, and further allowing said restoring force of said restoring mechanism to return said carriage carrying said retracted finger to said home position;
   f) withdrawing manually said first media cassette from said rack, whereby said second media cassette aided by gravity, moves to said position of said first media cassette with said major surface of said media cassette disposed against and substantially parallel to said inclined back.

16. A method of maintaining a first in, first out (FIFO) queue of media cassettes as recited in claim 15, the steps further comprising:
   g) placing an additional media cassette into said media cassette receiving portion of said rack with a lower edge on said sloping bottom and a major surface adjacent a major surface of said first media cassette.

17. A method of maintaining a first in, first out (FIFO) queue of media cassettes as recited in claim 16, the steps further comprising:

f) selectively repeating said placing step (g), said using step (d), said releasing step (e) and said withdrawing step (f).

* * * * *